(12) United States Patent
Gabale et al.

(10) Patent No.: US 11,699,162 B2
(45) Date of Patent: Jul. 11, 2023

(54) SYSTEM AND METHOD FOR GENERATING A MODIFIED DESIGN CREATIVE

(71) Applicant: INFILECT TECHNOLOGIES PRIVATE LIMITED, Bengaluru (IN)

(72) Inventors: Vijay Gabale, Bengaluru (IN); Anand Prabhu Subramanian, Bengaluru (IN)

(73) Assignee: INFILECT TECHNOLOGIES PRIVATE LIMITED, Bengaluru (IN)

( * ) Notice: Subject to any disclaimer, the term of this patent is extended or adjusted under 35 U.S.C. 154(b) by 0 days.

(21) Appl. No.: 17/417,721

(22) PCT Filed: Dec. 4, 2019

(86) PCT No.: PCT/IN2019/050881
§ 371 (c)(1),
(2) Date: Jun. 23, 2021

(87) PCT Pub. No.: WO2020/136668
PCT Pub. Date: Jul. 2, 2020

(65) Prior Publication Data
US 2022/0292548 A1    Sep. 15, 2022

(51) Int. Cl.
*G06Q 30/02* (2023.01)
*G06T 7/90* (2017.01)
(Continued)

(52) U.S. Cl.
CPC ............ *G06Q 30/02* (2013.01); *G06F 3/013* (2013.01); *G06Q 30/0276* (2013.01); *G06T 7/0002* (2013.01); *G06T 7/70* (2017.01); *G06T 7/90* (2017.01); *G06T 11/001* (2013.01); *G06T 17/00* (2013.01); *G06V 10/20* (2022.01); *G06V 10/40* (2022.01); *G06V 10/56* (2022.01); *G06V 10/82* (2022.01); *G06V 20/63* (2022.01); *G06T 2207/10016* (2013.01);
(Continued)

(58) Field of Classification Search
CPC ...... G06Q 30/02; G06Q 30/0276; G06T 7/90; G06T 7/70; G06T 7/0002; G06T 11/001; G06T 17/00; G06V 10/56; G06V 10/20; G06V 20/63; G06V 10/40; G06V 10/82; G06V 2201/09; G06F 3/013
USPC .......................................................... 345/419
See application file for complete search history.

(56) References Cited

U.S. PATENT DOCUMENTS

| 2008/0215418 A1* | 9/2008 | Kolve ................ G06Q 30/0201 705/7.29 |
| 2017/0278289 A1* | 9/2017 | Marino .................. G06T 7/536 |
| 2018/0061116 A1* | 3/2018 | Mitchell ................. G06F 3/011 |

* cited by examiner

Primary Examiner — Hai Tao Sun

(57) ABSTRACT

The system for recognizing one or more objects of a design creative within an environment, analyzing the one or more objects using a deep neural networking model and generating a modified design creative by (i) determining a location of a design creative within the media content, (iii) determining an object from the design creative, (iv) determining an attribute of the object, (v) implementing a compliance rule to the attribute of the object to determine a distinctness and an effectiveness of a brand product, (vi) generating an attention sequence and heatmap for the media content, (vii) automatically generating a first recommendation based on the compliance rule, the attention heatmap, and the attention sequence, and (viii) automatically generating a modified design creative for the environment based on the attention heatmap, the attention sequence and the generated first recommendation using the deep neural networking model.

14 Claims, 4 Drawing Sheets

(51) Int. Cl.
  *G06T 7/70* (2017.01)
  *G06V 10/82* (2022.01)
  *G06T 17/00* (2006.01)
  *G06V 10/20* (2022.01)
  *G06V 10/40* (2022.01)
  *G06V 20/62* (2022.01)
  *G06F 3/01* (2006.01)
  *G06Q 30/0241* (2023.01)
  *G06T 7/00* (2017.01)
  *G06T 11/00* (2006.01)
  *G06V 10/56* (2022.01)

(52) U.S. Cl.
  CPC ............... *G06T 2207/20081* (2013.01); *G06T 2207/20084* (2013.01); *G06V 2201/09* (2022.01)

SYSTEM AND METHOD FOR GENERATING A MODIFIED DESIGN CREATIVE

BACKGROUND

Technical Field

The embodiments herein generally relate to a system and method for recognizing and analyzing one or more objects in a design creative quantifying the design creative in a context or an environment by using neuro marketing or shopper psychology principles, and more specifically to a system and method for obtaining a modified design creative based on the analysis of the objects, analysis of heatmaps and analysis of attention sequences of the design creative in one or more contexts or environments.

Description of the Related Art

Designers of a digital store or a retail store design creatives to be placed in a physical store retail environment or digital store environment, do not get immediate and objective feedback on the goodness of the design creative in terms of its attention seeking-abilities, attractiveness quotient or the eventual click-through rate in case of online ads or fraction of eyeballs attracted in case of offline ads in order to test and improve the designs of design creatives. Existing solutions provides a tool in a design creative industry which takes the design creative as an input and gives out an attention heatmap. However, the tool does not have the ability to evaluate the design creative in the context of the environment as well as to give objective quantitative feedback to improve the design creative. Unfortunately, such feedbacks are received only after the design is created and piloted into the real environment or the digital store. However, this approach is very expensive as the design creative has already been created and displayed in the real environment. Thus, there is a need to create a test environment where a designer of a design creative simply uploads or drops a design creative and immediately gets an objective feedback in terms of the design and attention seeking score of the design creative to emulate a real-world environment and/or a real-world response of the intended audience.

Further, it is very difficult and cumbersome for human auditors to observe the design creatives and provide ranks and judgment on the design of the design creative with the help of ratings in case of online ads and human gaze in case of offline ads. Another related problem is such an approach of analyzing the design creative by human auditors does not parse the design creative to extract the fine level of details from the design creative such as position of a brand and a logo or a color and a size of a text. Such level of information helps the designer to have a recommendation or feedback on the design creatives. Therefore, the traditional method of analyzing and evaluating a design creative is costly and is not helping designers to improve their design before the design creative is created.

Accordingly, there remains a need for a system and method for recognizing and analyzing a design creative to generate an attention heatmap and attention sequence with a recommendation to improve a design creative in the context of the environment in which the design creative has to be placed.

SUMMARY

In view of the foregoing, an embodiment herein provides a processor-implemented method of recognizing one or more objects of a design creative within an environment, analyzing the one or more objects using a deep neural networking model and generating a modified design creative based on the analysis. The method includes steps of: (i) generating a database with a media content associated with an environment, (ii) determining a location of a design creative within the media content associated with the environment, (iii) determining, using a deep neural networking model, at least one object from the design creative within the environment, (iv) determining at least one attribute of the at least one determined object within the environment using the deep neural networking model, (v) implementing at least one compliance rule to the at least one attribute of the at least one object to determine at least one of a number of words in the text, a size of the brand logo or the brand name, a location of the brand logo or the brand name, a color contrast of the design creative in context of other design creative, a distinctness and an effectiveness of the brand product with respect to the environment, (vi) generating an attention sequence and a heatmap for the media content associated with the environment using the deep neural networking model, (vii) automatically generating a first recommendation for modifying the at least one object of the design creative within the environment based on the at least compliance rule, the attention sequence and the heatmap obtained corresponding to the design creative using the deep neural networking model, and (viii) automatically generating a modified design creative for the environment based on the attention heatmap, the attention sequence and the generated first recommendation using the deep neural networking model. In some embodiments, the media content is captured using a camera and the media content includes at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. In some embodiments, the at least one objects includes at least one of a brand name, a brand logo, a text, a product or a brand-specific object. In some embodiments, the deep neural networking model is trained using a one or more design creatives taken at one or more instances corresponding to one or more brands. In some embodiments, the at least one attribute includes a color, a color contrast, a location of the object, a text size, or a number of words in the text. In some embodiments, the at least one compliance rule includes at least one of a text compliance, a color compliance, a location compliance or a size compliance. In some embodiments, the attention sequence includes a sequence number for one or more pixel in the media content and the heatmap includes a heat for one or more different color of the one or more pixels in the media content. In some embodiments, the first recommendation for modifying at least one least one object includes at least one of a text prescription, a brand prescription, a brand color prescription or a product compliance.

In In some embodiments, the training of the deep neural networking model includes providing a collection of a user's eye movement on the design creative within the environment in which the design creative is placed using a headset and a recorded video with corresponding eye movement of the user, the user's eye movement includes an eye fixation, an amount of eye fixation and a sequence of eye fixation.

In some embodiments, the method includes steps of (i) plotting an eye fixation on an image of the recorded video of the media content, (ii) coloring the one or more pixel of the media content with a different color, and (iii) numbering each pixel of the media content with a sequence number. In some embodiments, the coloring of the one or more pixel of the media content with the different color signifies different heat on the media content within the environment.

In some embodiments, the attention sequence is generated using the numbering of each pixel of the media content and the attention heatmap is generated using different heat colors of the one or more pixels in the media content associated with the environment.

In some embodiments, the method includes the steps of computing an attention score for the modified design creative with respect to a plurality of environment using the deep neural networking model. In some embodiments, the attention score includes at least one of a text goodness score, a brand logo goodness score, a brand color goodness score and a product goodness score.

In some embodiments, the method includes the steps of implementing at least one neuromarketing rule to the at least one attribute of the at least one object to generate a second recommendation including at least one of increasing a height of the brand logo than the height of the design creative or decreasing a number of words in the text.

In some embodiments, the text prescription includes at least one of increasing or decreasing a size of the text, or increasing or decreasing a number of words in the text. In some embodiments, the brand prescription includes increasing or decreasing a size of the brand logo, the brand color prescription includes at least one of changing a color of the brand name or the brand logo, improving the color contrast of the brand name or the brand logo. In some embodiments, the product prescription includes adding a human face or a human figure on the design creative.

In some embodiments, the media content is converted into a three-dimensional model, when the media content is received from the digital retail store environment or the virtual reality store environment.

In some embodiments, the three-dimensional model is received in a virtual reality headset to create a virtual reality store design creative within the virtual reality environment.

In one aspect, one or more non-transitory computer readable storage medium storing a sequence of instructions, which when executed by a processor, performs a method of recognizing one or more objects of a design creative within an environment, analyzing the one or more objects using a deep neural networking model and generating a modified design creative based on the analysis, the method comprises the steps of: (i) generating a database with a media content associated with an environment, (ii) determining a location of a design creative within the media content associated with the environment, (iii) determining, using a deep neural networking model, at least one object from the design creative within the environment, (iv) determining at least one attribute of the at least one determined object within the environment using the deep neural networking model, (v) implementing at least one compliance rule to the at least one attribute of the at least one object to determine at least one of a number of words in the text, a size of the brand logo or the brand name, a location of the brand logo or the brand name, a color contrast of the design creative in context of other design creative, a distinctness and an effectiveness of the brand product with respect to the environment, (vi) generating an attention sequence and a heatmap for the media content associated with the environment using the deep neural networking model, (vii) automatically generating a first recommendation for modifying the at least one object of the design creative within the environment based on the at least compliance rule, the attention sequence and the heatmap obtained corresponding to the design creative using the deep neural networking model, and (viii) automatically generating a modified design creative for the environment based on the attention heatmap, the attention sequence and the generated first recommendation using the deep neural networking model. In some embodiments, the media content is captured using a camera and the media content includes at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. In some embodiments, the at least one objects includes at least one of a brand name, a brand logo, a text, a product or a brand-specific object, the deep neural networking model is trained using a one or more design creatives taken at one or more instances corresponding to one or more brands. In some embodiments, the at least one attribute includes a color, a color contrast, a location of the object, a text size, or a number of words in the text. In some embodiments, the at least one compliance rule includes at least one of a text compliance, a color compliance, a location compliance or a size compliance. In some embodiments, the attention sequence includes a sequence number for one or more pixel in the media content and the heatmap includes a heat for one or more different color of the one or more pixels in the media content. In some embodiments, the first recommendation for modifying at least one least one object includes at least one of a text prescription, a brand prescription, a brand color prescription or a product compliance.

In some embodiments, the training of the deep neural networking model includes providing a collection of a user's eye movement on the design creative within the environment in which the design creative is placed using a headset and a recorded video with corresponding eye movement of the user, wherein the user's eye movement includes an eye fixation, an amount of eye fixation and a sequence of eye fixation.

In some embodiments, the method includes steps of (i) plotting an eye fixation on an image of the recorded video of the media content (ii) coloring the plurality of pixel of the media content with a different color and (iii) numbering each pixel of the media content with a sequence number. In some embodiments, the coloring of the one or more pixel of the media content with the different color signifies different heat on the media content within the environment.

In some embodiments, the attention sequence is generated using the numbering of each pixel of the media content, and the attention heatmap is generated using different heat colors of the one or more pixels in the media content associated with the environment.

In some embodiments, the method includes the steps of computing an attention score for the modified design creative with respect to a plurality of environment using the deep neural networking model. In some embodiments, the attention score includes at least one of a text goodness score, a brand logo goodness score, a brand color goodness score and a product goodness score.

In some embodiments, the method includes the steps of implementing at least one neuromarketing rule to the at least one attribute of the at least one object to generate a second recommendation including at least one of increasing a height of the brand logo than the height of the design creative or decreasing a number of words in the text.

In some embodiments, the text prescription includes at least one of increasing or decreasing a size of the text, or increasing or decreasing a number of words in the text. In some embodiments, the brand prescription includes increasing or decreasing a size of the brand logo, the brand color prescription includes at least one of changing a color of the brand name or the brand logo, improving the color contrast of the brand name or the brand logo. In some embodiments, the product prescription comprises adding a human face or a human figure on the design creative.

In some embodiments, the media content is converted into a three-dimensional model, when the media content is received from the digital retail store environment or the virtual reality store environment.

In some embodiments, the three-dimensional model is received in a virtual reality headset to create a virtual reality store design creative within the virtual reality environment.

In another aspect, a system for recognizing one or more objects of a design creative within the environment, analyzing the one or more objects using a deep neural networking model and generating a modified design creative based on the analysis. The system includes a memory, and a device processor. The memory includes a database that stores a media content associated with the environment. The media content is captured using a camera. The media content includes at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. The database stores one or more modules executable by the device processor. The set of modules includes (i) a database generation module that generates a database of media content associated with the environment, (ii) a location determination module that determines a location of a design creative within the media content associated with the environment, (iii) an object recognition module that determines at least one object from the design creative within the environment using a deep neural networking model, (iv) an attribute determination module that determines at least one attribute of the at least one determined object within the environment using the deep neural networking model, (v) a compliance rule implementation module that implements at least one compliance rule to the at least one attribute of the at least one object to determine at least one of a number of words in the text, a size of the brand logo or the brand name, a location of the brand logo or the brand name, a color contrast of the design creative in context of other design creative, a distinctness and an effectiveness of the brand product with respect to the environment, (vi) a heatmap generation module that generates an attention sequence and a heatmap for the media content associated with the environment using the deep neural networking model, (vii) a recommendation module that automatically generates a first recommendation, using the deep neural networking model, for modifying the at least one object of the design creative within the environment based on the at least one compliance rule, the attention sequence and the heatmap obtained corresponding to the design creative, (viii) a neuromarketing implementation rule module that implements at least one neuromarketing rule to the at least one attribute of the at least one object to generate a second recommendation comprising at least one of increasing a height of the brand logo than the height of the design creative or decreasing a number of words in the text and (ix) a modified design creative module that generates a modified design creative within the environment based on the attention heatmap, the attention sequence, the first recommendation and the second recommendation using the deep neural networking model. The media content is captured using a camera and the media content includes at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. The at least one object comprises at least one of a brand name, a brand logo, a text, a product or a brand-specific object. The deep neural networking model is trained using one or more design creatives taken at one or more instances corresponding to one or more brands. The at least one attribute includes a color, a color contrast, a location of the object, a text size, or a number of words in the text. The at least one compliance rule includes at least one of a text compliance, a color compliance, a location compliance or a size compliance. The attention sequence includes a sequence number for one or more pixel in the media content and the heatmap includes a heat for one or more different color of the one or more pixels in the media content. The first recommendation for modifying at least one least one object includes at least one of a text prescription, a brand prescription, a brand color prescription or a product compliance In some embodiments, the text prescription includes at least one of increasing or decreasing a size of the text, or increasing or decreasing a number of words in the text. In some embodiments, the brand prescription includes increasing or decreasing a size of the brand logo, the brand color prescription includes at least one of changing a color of the brand name or the brand logo, improving the color contrast of the brand name or the brand logo. In some embodiments, the product prescription includes adding a human face or a human figure on the design creative.

The system may generate the design creative either in a real-time or in a virtual environment. The system may improve the design creative by providing an instant, an objective, a fine-level and perspective feedback. The system may provide recommendations for improving the design creative in real time. The system may asses improved or modified design creative either in the real-time or in the virtual environment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
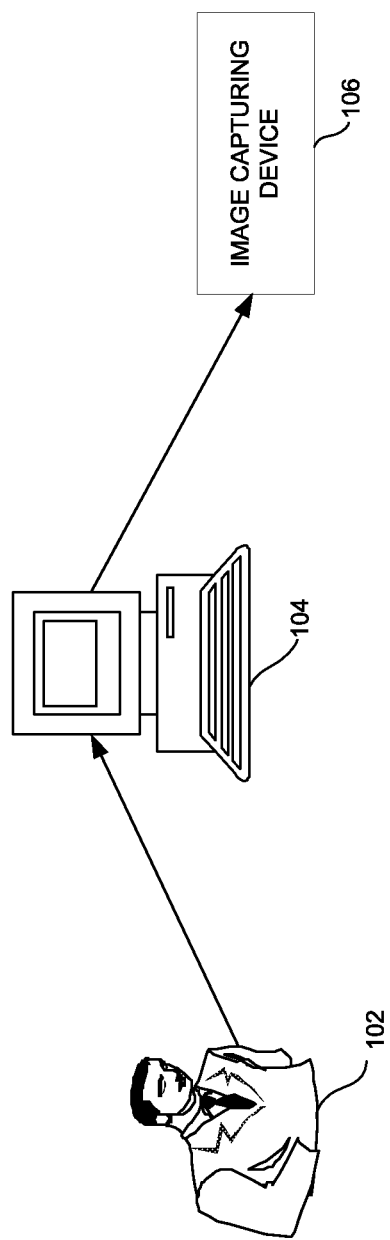
FIG. 1 illustrates a system view of a design creative generation system for evaluating and analyzing a design creative within the environment according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for recognizing and analyzing a plurality of objects in a design creative to generate a modified design creative based on the heatmaps and the attention sequence corresponding to the design creative. Referring now to the drawings, and more particularly to FIGS. 1 through 4, where similar reference characters denote corresponding features consistently throughout the figures, preferred embodiments are shown.

FIG. 1 illustrates a system view of a design creative generation system for evaluating and analyzing a design creative within an environment according to an embodiment herein. The design creative generation system 104 is communicatively connected to an image capturing device 106. A designer 102 is interacting with the design creative generation system 104 for evaluating and analyzing a design creative within an environment. In one embodiment, the design creative generation system 104 may be a mobile phone, a kindle, a PDA (Personal Digital Assistant), a tablet, a music player, a computer, an electronic notebook or a smartphone. The design creative generation system 104 includes a memory and a processor. The image capturing device 104 captures a media content from the environment. The design creative generation system 104 generates a database of media content associated with the environment. In an embodiment, the media content includes at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. The design creative generation system 104 determines a location of a design creative associated with the environment based on the extracted media content. The design creative generation system 104 includes a deep neural networking model to determine (i) at least one object from the design creative within the environment and (ii) at least one attribute of the at least one determined object within the environment. The at least one object may includes at least one of a brand name, a brand logo, a text, a product or a brand-specific object. The at least one attribute may include a color, a color contrast, a location of the object, a text size, or a number of words in the text. The design creative generation system 104 implements at least one compliance rule to determine at least one of a number of words in the text, a size of the brand logo or the brand name, a location of the brand logo or the brand name, a color contrast of the design creative in context of other design creative, a distinctness and an effectiveness of the brand product with respect to the environment.

In an embodiment, the neural networking model is a machine learning technique that is designed to recognize and interpret the data through a machine perception, a labeling and by clustering the raw data. The neural networking model is trained to interpret the raw data by providing a collection of data as an input. The neural networking model is trained to perform the task with the processor.

The neural networking model is trained by providing a collection of a user's eye movement on the design creative within the environment in which the design creative is placed using a headset and a recorded video with corresponding eye movement of the user, wherein the user's eye movement includes an eye fixation, an amount of eye fixation and a sequence of eye fixation. In an embodiment, the eye movement of a plurality of users on the media content is collected by tracking the eye movement of the plurality of user's visiting a plurality of the physical retail store environment. The eye movement of the plurality of user's visiting the plurality of the physical retail store environment may be tracked using a headset or a virtual reality headset. The headset records a video for the plurality of user's visiting the plurality of the physical retail store environment. The recorded video includes the eye movement synchronized with the video for each of the plurality of the users visiting the plurality of the physical retail store environment. A fixed image of the media content is taken from the recorded video containing the eye movement of each of the plurality of users visiting the plurality of the physical retail store environment. The fixed image of the media content associated with the environment includes a plurality of pixels. The plurality of pixel of the fixed images of the media content within the environment may be colored with a plurality of different colors. The plurality of different color may signify a different amount of heat on the media content within the environment. Based on the different amount of heat on the image of the media content, the design creative generation system 104 generates the attention heatmap of the corresponding image of the media content with respect to the environment in which the media content is placed. The plurality of pixels may be marked with a different sequence number. Using different sequence number, the design creative generation system 104 generates the attention sequence for the corresponding image of the media content. The attention sequence is superimposed with the attention heatmap. The superimposition of the attention sequence to the attention heatmap provides a higher weight to a pixel of the image of the media content within the environment which catches the attention of the maximum number of the users from the plurality of users visiting the plurality of the physical retail store environment. The design creative generation system 104 generates a first recommendation for modifying the at least one object of the design creative within the environment using the neural networking model based on the at least one compliance rule, the attention sequence and the heatmap obtained corresponding to the design creative. In some embodiment, the design creative generation system 104 includes a neuromarketing implementation rule module that implements at least one neuromarketing rule to the at least one attribute of the at least one object to generate a second recommendation comprising at least one of increasing a height of the brand logo than the height of the design creative or decreasing a number of words in the text.

The design creative generation system 104 generates a modified design creative within the environment for the user based on the attention heatmap, the attention sequence, the first recommendation and the second recommendation using the deep neural networking model.

Figure 2:
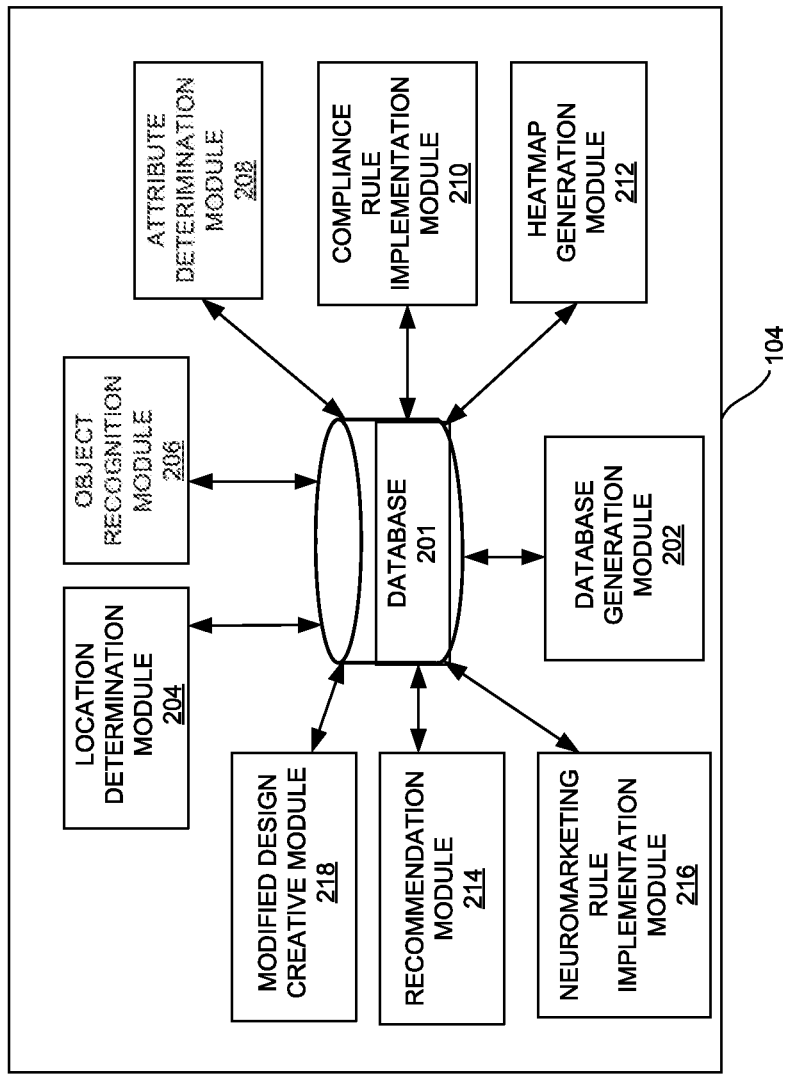
FIG. 2 is an exploded view of the design creative generation system of FIG. 1 according to an embodiment herein.

FIG. 2 is an exploded view of the design creative generation system 104 of FIG. 1 according to an embodiment herein. The design creative generation system 104 includes a database 201, a database generation module 202, a location determination module 204, an object recognition module 206, an attribute determination module 208, a compliance rule implementation module 210, a heatmap generation module 212, a recommendation module 214, a neuromarketing rule implementation module 216 and a modified design creative module 218. The design creative generation system 104 receives a media content to analyze and recognize the plurality of objects in a design creative within the media content. The media content may be stored in the database 201 of a memory. The database generation module 202 generates a media content associated with the environment. In an embodiment, the media content is captured using a camera. The media content may include at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. The location determination module 204 determines a location of the design creative within the media content associated with the environment.

The object recognition module 206 determines at least one object from the design creative within the environment using a deep neural networking model. The at least one object includes at least one of a brand name, a brand logo, a text, a product or a brand-specific object. The deep neural networking model is trained using a plurality of design creatives taken at a plurality of instances corresponding to a plurality of brands. The attribute determination module 208 determines at least one attribute of the at least one determined object within the environment using the deep neural networking model. In an embodiment, the at least one attribute includes a color, a color contrast, a location of the object, a text size, or a number of words in the text. The compliance rule implementation module 210 implements at least one compliance rule to the at least one attribute of the at least one object to determine at least one of a number of words in the text, a size of the brand logo or the brand name, a location of the brand logo or the brand name, a color contrast of the design creative in context of other design creative, a distinctness and an effectiveness of the brand product with respect to the environment.

In an embodiment, at least one compliance rule comprises at least one of a text compliance, a color compliance, a location compliance or a size compliance. The heatmap generation module 212 generates an attention sequence and an attention heatmap for the media content associated with the environment using the deep neural networking model. The attention sequence includes a sequence number for a plurality of pixel in the media content and the heatmap includes a heat for a plurality of different color of the plurality of pixels in the media content. The recommendation module 214 automatically generates a first recommendation for modifying the at least one object of the design creative within the environment based on the at least one compliance rule, the attention sequence and the heatmap obtained corresponding to the design creative using the deep neural networking model. The first recommendation for modifying at least one least one object includes at least one of a text prescription, a brand prescription, a brand color prescription or a product compliance.

The neuromarketing implementation rule module 216 implements at least one neuromarketing rule to the at least one attribute of the at least one object to generate a second recommendation including at least one of increasing a height of the brand logo than the height of the design creative or decreasing a number of words in the text. The second recommendation is based on a plurality of neuromarketing rules. The plurality of neuromarketing rules is derived by analyzing the eye movement of the plurality of users on the plurality of images of the design creative. In one embodiment, the second recommendation includes a recommendation to increase the height of the brand logo by 10% than the height of the design creative and a recommendation to decrease the number of words in the text to less than 10 words. In some embodiments, the attention score is computed for the design creative with respect to the environment using the deep neural networking model. The attention score includes the text goodness score, the brand logo goodness score, the brand color goodness score and the product goodness score.

The modified design creative module 218 automatically generates a modified design creative module that generates a modified design creative within the environment based on the attention heatmap, the attention sequence, the first recommendation and the second recommendation using the deep neural networking model.

In an embodiment, the object recognition module 206 uses the deep neural networking model to recognize the plurality of objects in the design creative. The deep neural networking model is trained to recognize the plurality of objects in the design creative. The neural networking model is trained by providing the plurality of images of the design creative as an input. The plurality of images of the design creative is taken at the plurality of instances corresponding to the plurality of brands. In another embodiment, the plurality of instances includes images of the design creative taken from a plurality of angles. The plurality of angles includes a front view, a back view, a rear view and a side view of the design creative. In some embodiment, the plurality of objects includes a brand name, a brand logo, a text, a product and a brand-specific object. In another embodiment, the attribute recognition module 206 detects and recognizes at least one attribute of the at least one determined object of the design creative within the environment.

The at least one attribute includes a color of the detected object on the design creative or a color of the design creative, a color contrast of the detected object on the design creative in context of the color of the corresponding design creative on which the object is detected, a location of the detected object on the design creative, a size of the object and number of words in the object when the object is a text. In an embodiment, the compliance rule implementation module 210 determines whether the recognized attribute of the object is in accordance with the standard marketing rules. The compliance rule includes a text compliance, a size compliance, a location compliance and a color compliance. In one embodiment, the text compliance determines whether a size and a number of words in the text are in accordance with the marketing rules. The size compliance may determine whether a size of the plurality of objects in the design creative is in accordance with the marketing rules. The color compliance may determine whether a color of the detected object on the design creative or the color of the design creative and the color contrast of the detected object on the design creative in context of the color of the corresponding design creative on which the object is detected is in accordance with the marketing rules. The location compliance may determine whether a location of the detected object on the design creative is in accordance with the marking rules.

The compliance rule implementation module 210 determines an effectiveness and a distinctiveness of the brand logo with respect to the environment in which the design creative is placed. In an embodiment, the neural network model is trained to generate the attention heatmap and the attention sequence by inputting the plurality of the media content. The plurality of the media content may include a user's eye movement when the media content is the image of the design creative, the video of the design creative, the shelf design creative, the point of sale material creative or the digital advertisement creative. The user's eye movement includes an eye fixation, an amount of eye fixation and a sequence of eye fixation.

In an embodiment, the recommendation module 214 automatically generates a first recommendation for modifying at least one object of the design creative within the environment by using the deep neural network model 108 based on the at least one compliance rule, the attention sequence and the heatmap obtained corresponding to the design creative. The neural network model 108 uses the results obtained by the compliance rule implementation module 210 and the heatmap generation module 212 to generate the first recommendation. The first recommendation to modify the at least one determined objects of the design creative may include a text prescription, a brand prescription, a brand color prescription and a product compliance prescription. In another embodiment, the text prescription includes a prescription to increase or decrease a size of the text and increasing or decreasing a number of words in a text. The brand prescription may include a prescription to increase or decrease a size of a brand logo. The brand color prescription may include a prescription to change the color of the brand logo or the brand name and to improve the color contrast of the brand name or brand logo in context of the color of the design creative. The product prescription may include a prescription to add an image of the product, a human face or a human figure on the design creative. In another embodiment, the modified design creative is automatically generated based on the attention heatmap, the attention sequence, the attention score, the first recommendation and the second recommendation.

Figure 3:
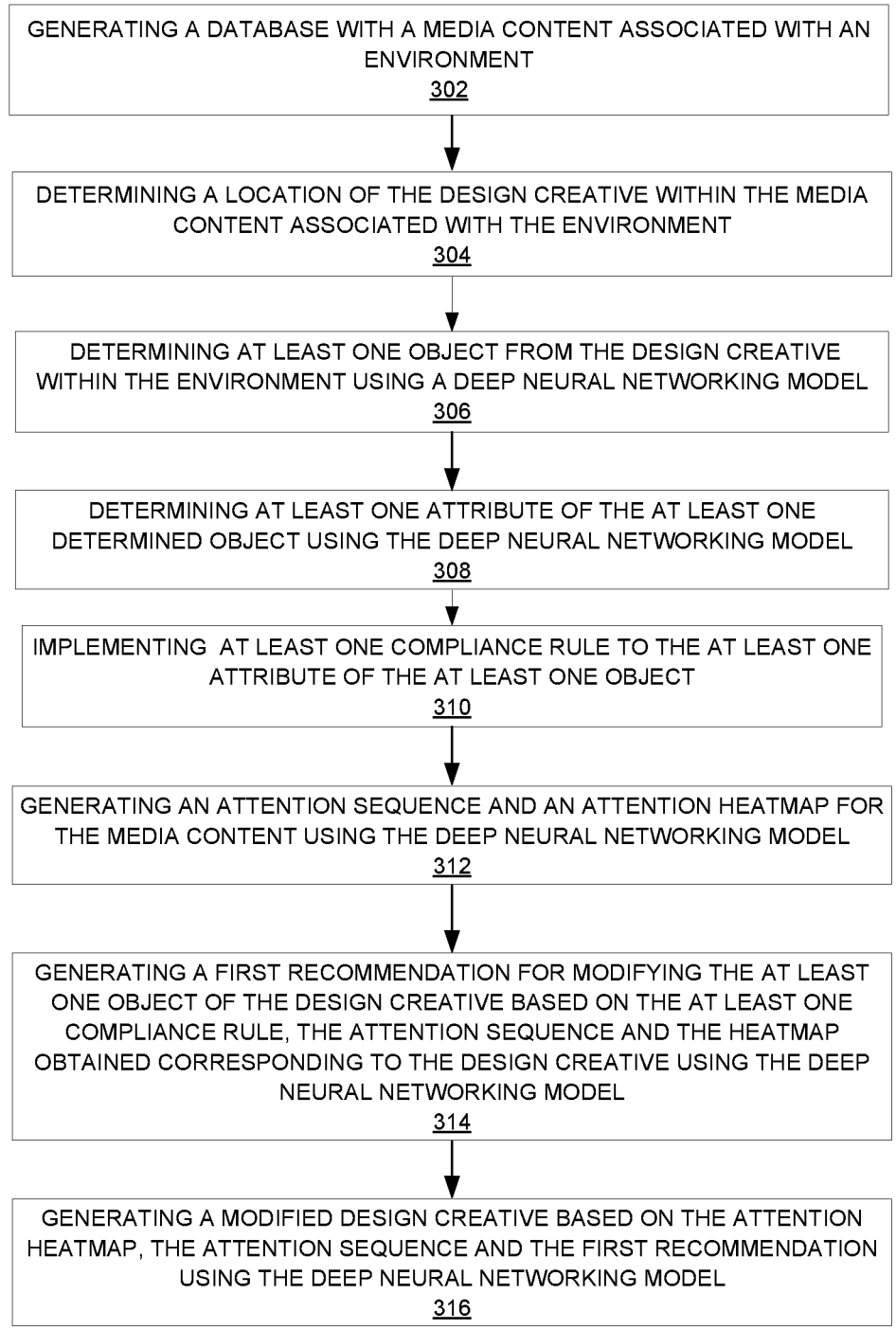
FIG. 3 illustrates a flow diagram of a method of evaluating and analyzing a design creative within the environment using the design creative generation system according to an embodiment herein.

FIG. 3 is a flow diagram that illustrates a method of evaluating and analyzing a design creative within the environment using the design creative generation system of FIG. 1 according to an embodiment herein. At step 302, a database of a media content associated with an environment is generated. At step 304, a location of the design creative within the media content associated with the environment is determined. At step 306, at least one object from the design creative within the environment is determined using a deep neural networking model. At step 308, at least one attribute of the at least one determined object within the environment is determined using the deep neural networking model. At step 310, at least one compliance rule is implemented to the at least one attribute of the at least one object to determine at least one of a number of words in the text, a size of the brand logo or the brand name, a location of the brand logo or the brand name, a color contrast of the design creative in context of other design creative, a distinctness and an effectiveness of the brand product with respect to the environment. At step 312, an attention sequence and an attention heatmap for the media content associated with the environment are generated using the deep neural networking model. At step 314, a first recommendation for modifying the at least one object of the design creative within the environment is automatically generated based on the at least one compliance rule, the attention sequence and the heatmap obtained corresponding to the design creative using the deep neural networking model. At step 316, a modified design creative for the environment is generated using the deep neural networking model based on the attention heatmap, the attention sequence and the generated first recommendation.

In an embodiment, the media content is captured using a camera, and the media content includes at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment. The at least one objects may include at least one of a brand name, a brand logo, a text, a product or a brand-specific object. The deep neural networking model may be trained using a one or more design creatives taken at one or more instances corresponding to one or more brands. The at least one attribute may include a color, a color contrast, a location of the object, a text size, or a number of words in the text. The at least one compliance rule may include at least one of a text compliance, a color compliance, a location compliance or a size compliance. The attention sequence may include a sequence number for one or more pixel in the media content and the heatmap may include a heat for one or more different color of the one or more pixels in the media content. The first recommendation for modifying at least one least one object may include at least one of a text prescription, a brand prescription, a brand color prescription or a product compliance.

Figure 4:
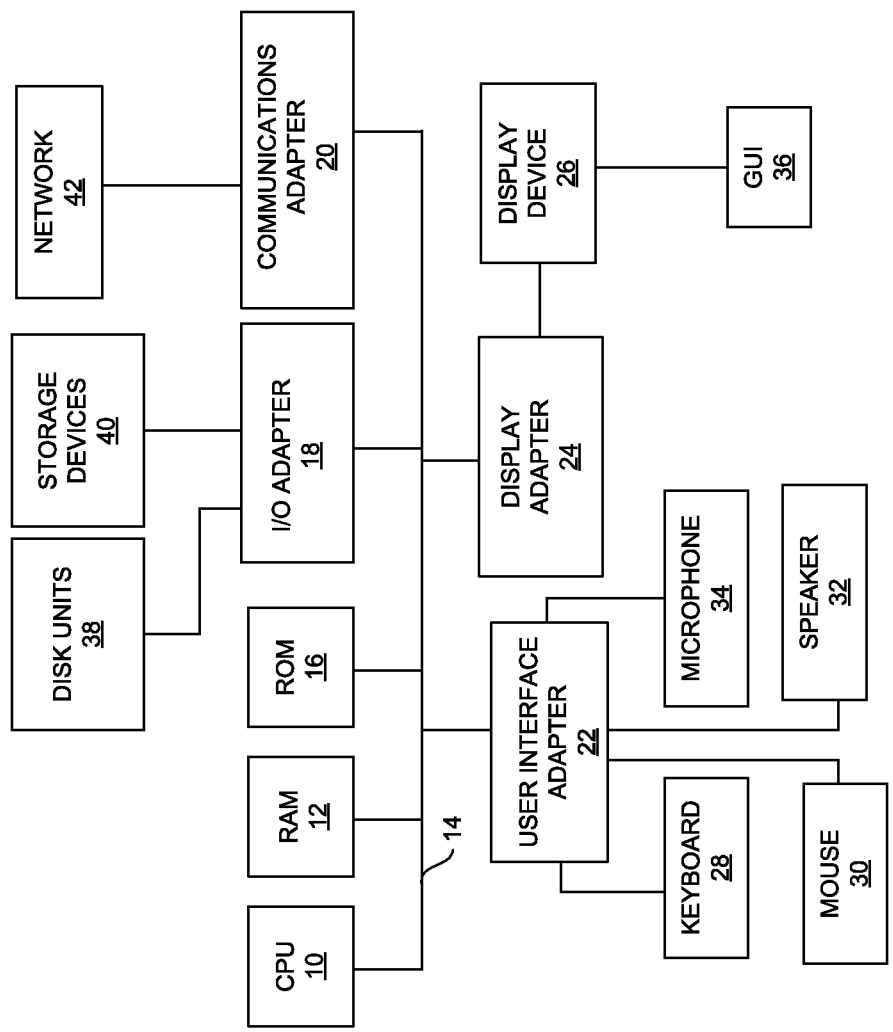
FIG. 4 is a schematic diagram of a computer architecture in accordance with the embodiments herein.

A representative hardware environment for practicing the embodiments herein is depicted in FIG. 4, with reference to FIGS. 1 through 3. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A processor-implemented method of recognizing a plurality of objects of a design creative within an environment, analyzing the plurality of objects using a deep neural networking model and generating a modified design creative based on the analysis, the method comprising:
    generating a database with a media content associated with an environment, wherein the media content is captured using a camera, wherein the media content comprises at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment;
    determining a location of a design creative within the media content associated with the environment;
    determining, using a deep neural networking model, at least one object from the design creative within the environment, wherein said at least one object comprises at least one of a brand name, a brand logo, a text, a product or a brand-specific object, wherein the deep neural networking model is trained using a plurality of design creatives taken at a plurality of instances corresponding to a plurality of brands, wherein the training of the deep neural networking model comprises providing a collection of a user's eye movement on the design creative within the environment in which the design creative is placed using a headset and a recorded video with corresponding eye movement of the user, wherein the user's eye movement comprises an eye fixation, an amount of eye fixation and a sequence of eye fixation;
    determining at least one attribute of at least one object within the media content associated with the environment using a deep neural networking model, wherein said at least one attribute comprises a color, a color contrast, a location of the object, a text size, or a number of words in the text;
    implementing at least one compliance rule to the at least one attribute of the at least one object to determine at least one of a number of words in the text, a size of the brand logo or the brand name, a location of the brand logo or the brand name, a color contrast of a design creative in context of other design creative, a distinctness and an effectiveness of the brand product with respect to the environment, wherein said at least one compliance rule comprises at least one of a text compliance, a color compliance, a location compliance or a size compliance;
    generating an attention sequence and a heatmap for the media content associated with the environment using the deep neural networking model, wherein attention sequence comprises a sequence number for a plurality of pixel in the media content and the heatmap comprises a heat for a plurality of different color of the plurality of pixels in the media content;
    plotting an eye fixation on an image of the recorded video of the media content;
    coloring the plurality of pixel of the media content with a different color; and
    numbering each pixel of the media content with a sequence number, wherein the coloring of the plurality of pixel of the design creative with the different color signifies different heat on the design creative within the environment, wherein the attention sequence is generated using the numbering of each pixel of the media content, and wherein the attention heatmap is generated using different heat colors of the plurality of pixels in the media content associated with the environment;
    automatically generating, using the deep neural networking model, a first recommendation for modifying the at least one object of the design creative within the environment based on the at least one compliance rule, the attention sequence and the heatmap obtained corresponding to the design creative, wherein the first recommendation for modifying at least one least one object comprises at least one of a text prescription, a brand prescription, a brand color prescription or a product compliance; and
    automatically generating, using the deep neural networking model, a modified design creative for the environment based on the attention heatmap, the attention sequence and the generated first recommendation.

2. The processor-implemented method as claimed in claim 1, wherein the method comprises computing an attention score for the modified design creative with respect to a plurality of environments using the deep neural networking model, wherein the attention score comprises at least one of a text goodness score, a brand logo goodness score, a brand color goodness score and a product goodness score.

3. The processor-implemented method as claimed in claim 1, wherein the method comprises implementing at least one neuromarketing rule to the at least one attribute of the at least one object to generate a second recommendation comprising at least one of increasing a height of the brand logo than the height of the design creative or decreasing a number of words in the text.

4. The processor implemented method as claimed in claim 1, wherein the text prescription comprises at least one of increasing or decreasing a size of the text, or increasing or decreasing a number of words in the text, wherein the brand prescription comprises increasing or decreasing a size of the brand logo, wherein the brand color prescription comprises at least one of changing a color of the brand name or the brand logo, improving the color contrast of the brand name or the brand logo, wherein the product prescription comprises adding a human face or a human figure on the design creative.

5. The processor-implemented method as claimed in claim 1, wherein the media content is converted into a three-dimensional model when the media content is received from the digital retail store environment or the virtual reality store environment.

6. The processor-implemented method as claimed in claim 5, wherein the three-dimensional model is received in a virtual reality headset to create a virtual reality store design creative within the virtual reality environment.

7. The one or more non-transitory computer-readable storage mediums storing the one or more sequences of instructions, which when executed by the one or more processors, causes to perform a method of recognizing a plurality of objects of a design creative within an environment, analyzing the plurality of objects using a deep neural networking model and generating a modified design creative based on the analysis, wherein the method comprises:

generating a database with a media content associated with an environment, wherein the media content is captured using a camera, wherein the media content comprises at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment;

determining a location of a design creative within the media content associated with the environment;

determining, using a deep neural networking model, at least one object from the design creative within the environment, wherein at least one object comprises at least one of a brand name, a brand logo, a text, a product or a brand-specific object, wherein the deep neural networking model is trained using a plurality of design creatives taken at a plurality of instances corresponding to a plurality of brands, wherein the training of the deep neural networking model comprises providing a collection of a user's eye movement on the design creative within the environment in which the design creative is placed using a headset and a recorded video with corresponding eye movement of the user, wherein the user's eye movement comprises an eye fixation, an amount of eye fixation and a sequence of eye fixation;

determining at least one attribute of at least one object within the media content associated with the environment using a deep neural networking model, wherein at least one attribute comprises a color, a color contrast, a location of the object, a text size, or a number of words in the text;

implementing at least one compliance rule to the at least one attribute of the at least one object to determine at least one of a number of words in the text, a size of the brand logo or the brand name, a location of the brand logo or the brand name, a color contrast of a design creative in context of other design creative, a distinctness and an effectiveness of the brand product with respect to the environment, wherein at least one compliance rule comprises at least one of a text compliance, a color compliance, a location compliance or a size compliance; generating an attention sequence and a heatmap for the media content associated with the environment using the deep neural networking model, wherein attention sequence comprises a sequence number for a plurality of pixel in the media content and the heatmap comprises a heat for a plurality of different color of the plurality of pixels in the media content;

plotting an eye fixation on an image of the recorded video of the media content;

coloring the plurality of pixel of the media content with a different color; and numbering each pixel of the media content with a sequence number, wherein the coloring of the plurality of pixel of the design creative with the different color signifies different heat on the design creative within the environment, wherein the attention sequence is generated using the numbering of each pixel of the media content, and wherein the attention heatmap is generated using different heat colors of the plurality of pixels in the media content associated with the environment;

automatically generating, using the deep neural networking model, a first recommendation for modifying the at least one object of the design creative within the environment based on the at least one compliance rule, the attention sequence and the heatmap obtained corresponding to the design creative, wherein the first recommendation for modifying at least one least one object comprises at least one of a text prescription, a brand prescription, a brand color prescription or a product compliance; and automatically generating, using the deep neural networking model, a modified design creative for the environment based on the attention heatmap, the attention sequence and the generated first recommendation.

8. The one or more non-transitory computer-readable storage mediums as claimed in claim 7, wherein the method comprises computing an attention score for the modified design creative with respect to a plurality of environments using the deep neural networking model, wherein the attention score comprises at least one of a text goodness score, a brand logo goodness score, a brand color goodness score and a product goodness score.

9. The one or more non-transitory computer-readable storage mediums as claimed in claim 7, wherein the method comprises implementing at least one neuromarketing rule to the at least one attribute of the at least one object to generate a second recommendation comprising at least one of increasing a height of the brand logo than the height of the design creative or decreasing a number of words in the text.

10. The one or more non-transitory computer-readable storage mediums as claimed in claim 7, wherein the text prescription comprises at least one of increasing or decreasing a size of the text, or increasing or decreasing a number of words in the text, wherein the brand prescription comprises increasing or decreasing a size of the brand logo, wherein the brand color prescription comprises at least one of changing a color of the brand name or the brand logo, improving the color contrast of the brand name or the brand logo, wherein the product prescription comprises adding a human face or a human figure on the design creative.

11. The one or more non-transitory computer-readable storage mediums as claimed in claim 7, wherein the media content is converted into a three-dimensional model when the media content is received from the digital retail store environment or the virtual reality store environment.

12. The one or more non-transitory computer-readable storage mediums as claimed in claim 11, wherein the three-dimensional model is received in a virtual reality headset to create a virtual reality store design creative within the virtual reality environment.

13. A system for recognizing a plurality of objects of a design creative within the environment, analyzing the plurality of objects using a deep neural networking model and generating a modified design creative based on the analysis, the system comprising:

a memory that stores a database and a set of modules;
a device processor that executes said set of modules, wherein said set of modules comprise:
a database generation module (202) that generates a database of media content associated with the environment, wherein the media content is captured using a camera, wherein the media content comprises at least one of an image of a design creative, a video of a design creative, a shelf design creative, a point of sale material creative, a digital advertisement creative or an image, a video or a three-dimensional model of at least one of a physical retail store environment, a digital retail store environment, a virtual reality store environment, a social media environment or a web page environment;
a location determination module (204) that determines a location of a design creative within the media content associated with the environment;
an object recognition module (206) that determines at least one object from the design creative within the environment using a deep neural networking model, wherein said at least one object comprises at least one of a brand name, a brand logo, a text, a product or a brand-specific object, wherein the deep neural networking model is trained using a plurality of design creatives taken at a plurality of instances corresponding to a plurality of brands, wherein the training of the deep neural networking model comprises providing a collection of a user's eye movement on the design creative within the environment in which the design creative is placed using a headset and a recorded video with corresponding eye movement of the user, wherein the user's eye movement comprises an eye fixation, an amount of eye fixation and a sequence of eye fixation;
an attribute determination module (208) that determines at least one attribute of the at least one determined object within the environment using the deep neural networking model, wherein said at least one attribute comprises a color, a color contrast, a location of the object, a text size, or a number of words in the text;
a compliance rule implementation module (210) that implements at least one compliance rule to the at least one attribute of the at least one object to determine at least one of a number of words in the text, a size of the brand logo or the brand name, a location of the brand logo or the brand name, a color contrast of the design creative in context of other design creative, a distinctness and an effectiveness of the brand product with respect to the environment, wherein said at least one compliance rule comprises at least one of a text compliance, a color compliance, a location compliance or a size compliance;
a heatmap generation module (212) that generates an attention sequence and a heatmap for the media content associated with the environment using the deep neural networking model, wherein said attention sequence comprises a sequence number for a plurality of pixel in the media content and the heatmap comprises a heat for a plurality of different color of the plurality of pixels in the media content, wherein the device processor plots an eye fixation on an image of the recorded video of the media content, colors the plurality of pixel of the media content with a different color, and numbers each pixel of the media content with a sequence number, wherein the coloring of the plurality of pixel of the design creative with the different color signifies different heat on the design creative within the environment, wherein the attention sequence is generated using the numbering of each pixel of the media content, and wherein the attention heatmap is generated using different heat colors of the plurality of pixels in the media content associated with the environment;
a recommendation module (214) that automatically generates a first recommendation for modifying the at least one object of the design creative within the environment based on the at least one compliance rule, the attention sequence and the heatmap obtained corresponding to the design creative using the deep neural networking model, wherein the first recommendation for modifying at least one least one object comprises at least one of a text prescription, a brand prescription, a brand color prescription or a product compliance;
a neuromarketing rule implementation module (216) that implements at least one neuromarketing rule to the at least one attribute of the at least one object to generate a second recommendation comprising at least one of increasing a height of the brand logo than the height of the design creative or decreasing a number of words in the text; and
a modified design creative module (218) that automatically generates a modified design creative within the environment based on the attention heatmap, the attention sequence, the first recommendation and the second recommendation using the deep neural networking model.

14. The system as claimed in claim 13, wherein the text prescription comprises at least one of increasing or decreasing a size of the text, or increasing or decreasing a number of words in the text, wherein the brand prescription comprises increasing or decreasing a size of the brand logo, wherein the brand color prescription comprises at least one of changing a color of the brand name or the brand logo, improving the color contrast of the brand name or the brand logo, wherein the product prescription comprises adding a human face or a human figure on the design creative.

* * * * *